(12) United States Patent
Deore et al.

(10) Patent No.: US 10,769,605 B2
(45) Date of Patent: Sep. 8, 2020

(54) MODULATION FORMAT CHANGE AND LICENSE UPDATING

(71) Applicant: Infinera Corporation, Sunnyvale, CA (US)

(72) Inventors: Abhijeet D. Deore, Sunnyvale, CA (US); Ramnarayan Srinivasan, Bangalore (IN); Ashok Kunjidhapatham, Bangalore (IN); Biao Lu, Cupertino, CA (US)

(73) Assignee: Infinera Corporation, Sunnyvale, CA (US)

( * ) Notice: Subject to any disclaimer, the term of this patent is extended or adjusted under 35 U.S.C. 154(b) by 1485 days.

(21) Appl. No.: 13/933,689

(22) Filed: Jul. 2, 2013

(65) Prior Publication Data

US 2015/0010304 A1    Jan. 8, 2015

(51) Int. Cl.
*G06Q 20/12* (2012.01)
*H04B 10/27* (2013.01)
*H04J 14/02* (2006.01)
*H04L 27/00* (2006.01)

(52) U.S. Cl.
CPC ......... *G06Q 20/1235* (2013.01); *H04B 10/27* (2013.01); *H04J 14/0272* (2013.01); *H04L 27/0008* (2013.01)

(58) Field of Classification Search
CPC .................. G06Q 20/1235; H04J 14/0272
USPC .............................................. 705/59
See application file for complete search history.

(56) References Cited

U.S. PATENT DOCUMENTS

| | | | |
|---|---|---|---|
| 6,915,278 B1* | 7/2005 | Ferrante | G06F 21/105 380/201 |
| 2003/0103528 A1* | 6/2003 | Kawaguchi | H04L 63/104 370/468 |
| 2010/0293622 A1* | 11/2010 | Nikitin | G06F 21/105 726/31 |
| 2011/0299858 A1* | 12/2011 | Mazzini | H04B 10/516 398/183 |

* cited by examiner

*Primary Examiner* — Zeshan Qayyum
(74) *Attorney, Agent, or Firm* — David L. Soltz

(57) ABSTRACT

One or more servers may receive an instruction to change a modulation format, associated with one or more optical channels, from a first modulation format to a second modulation format; provide the instruction to change the modulation format to a network device, associated with the one or more optical channels, to cause the network device to change the modulation format, associated with the one or more optical channels, from the first modulation format to the second modulation format; and determine that a license repository is to be updated based on receiving the instruction to change the modulation format. The license repository may store one or more licenses. The one or more servers may generate a license update instruction to update the license repository based on determining that the license repository is to be updated and output the license update instruction to cause the license repository to be updated.

7 Claims, 11 Drawing Sheets

MODULATION FORMAT CHANGE AND LICENSE UPDATING

BACKGROUND

In an optical communications system, data may be transported via digital signals over optical channels. A digital signal processor (DSP) may be provided to receive a particular digital signal, via a particular optical channel, and modulate the digital signal (e.g., based on bits associated with the data) to represent the data, associated with the digital signal, as symbols. The modulated digital signal can be provided to an analog to digital converter to provide corresponding analog signals to a modulator. The modulator may modulate a phase of a reference signal to form an output data signal (e.g., to convey the data over a carrier wave associated with the reference signal).

A receiving device may receive the output data signal and may compare the phase of the output data signal to a local reference signal. Based on the difference between the phase of the output data signal and the phase of the local reference signal, the receiving device may recover the data associated with the output data signal.

A DSP may modulate a digital signal based on a particular modulation format, (e.g., quadrature phase shift keying (QPSK), binary phase shift keying (BPSK), 16 quadrature amplitude modulation (16QAM), 32QAM, or the like). A particular modulation format may have particular advantages/disadvantages with respect to another modulation format. For example, some modulation formats may offer higher bit rates in exchange for lower transmission range. Also, different modulation formats may have different associated costs (e.g., licensing costs, transmission costs, etc.).

SUMMARY

According to some possible implementations, a method may include receiving, by one or more servers, an instruction to change a modulation format, associated with one or more optical channels, from a first modulation format to a second modulation format; providing, by the one or more servers, the instruction to change the modulation format to a network device, associated with the one or more optical channels, to cause the network device to change the modulation format, associated with the one or more optical channels, from the first modulation format to the second modulation format; and determining, by the one or more servers, that a license repository is to be updated based on receiving the instruction to change the modulation format. The license repository may store one or more licenses. The method may include generating, by the one or more servers, a license update instruction to update the license repository based on determining that the license repository is to be updated and outputting, by the one or more servers, the license update instruction to cause the license repository to be updated.

According to some possible implementations, one or more devices may receive an instruction to change a modulation format, associated with one or more optical channels, from a first modulation format to a second modulation format; provide the instruction to change the modulation format to a network device, associated with the one or more optical channels, to cause one or more digital signal processors (DSPs), implemented within the network device and associated with the one or more optical channels, to change the modulation format from the first modulation format to the second modulation format; and determine that a license repository is to be updated based on receiving the instruction to change the modulation format. The license repository may store one or more licenses. The one or more devices may generate a license update instruction to update the license repository based on determining that the license repository is to be updated and output the license update instruction to cause the license repository to be updated.

According to some possible implementations a computer-readable medium for storing instructions may include multiple instructions which, when executed by one or more processors, cause the one or more processors to receive an instruction to change a modulation format, associated with one or more optical channels, from a first modulation format to a second modulation format; provide the instruction to change the modulation format to a network device, associated with the one or more optical channels, to cause the network device to change the modulation format, associated with the one or more optical channels, from the first modulation format to the second modulation format. The instruction to change the modulation format may cause the network device to modulate an input signal based on the second modulation format, and provide, based on modulating the input signal, a wave division multiplexed (WDM) signal, corresponding to the input signal, to a receiving device. The multiple instructions may cause the one or more processors to determine that a license repository is to be updated based on receiving the instruction to change the modulation format. The license repository may store one or more licenses. The multiple instructions may cause the one or more processors to generate a license update instruction to update the license repository based on determining that the license repository is to be updated and output the license update instruction to cause at least one of the one or more licenses to be modified, a new license to be added, or one or more licenses to be deleted.

DETAILED DESCRIPTION

The following detailed description refers to the accompanying drawings. The same reference numbers in different drawings may identify the same or similar elements.

Systems and/or methods, as described herein, may provide a technique to change a modulation format used by a digital signal processor (DSP) to modulate a digital signal (e.g., a binary phase shift keying (BPSK) modulation format, a quadrature phase shift keying (QPSK) modulation format, a 3 quadrature amplitude modulation (3QAM) format, an 8QAM format, a 16QAM format, a 32QAM format, a 64QAM format, a 128QAM format, a 256QAM format, or some other type of modulation format). The systems and/or methods may further update a license, associated with a network device that transmits data via an optical channel, that provides authorization to access the optical channel and authorization for the modified modulation format to be used.

Figure 1:
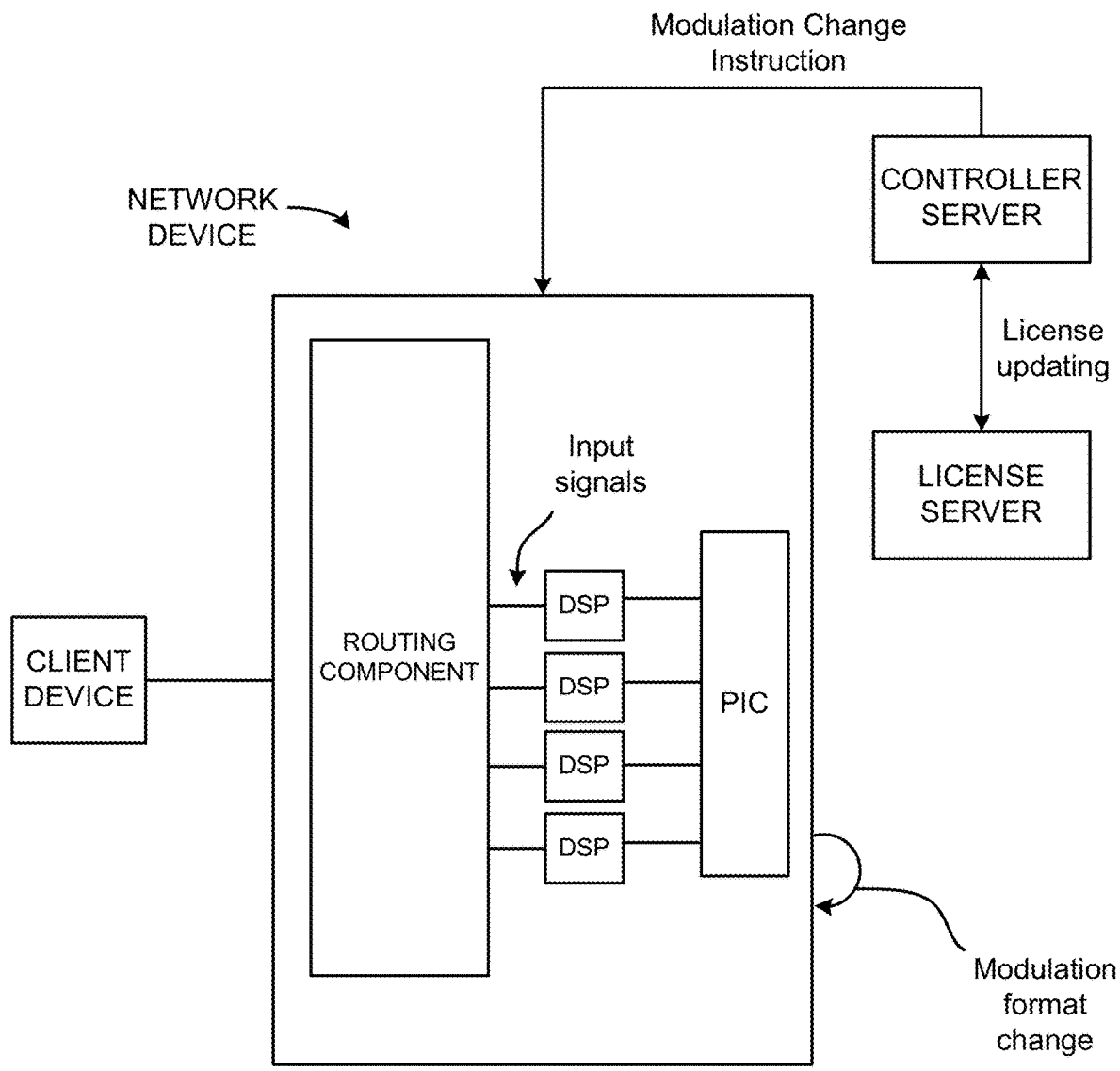
FIG. 1 illustrates an example overview of an implementation described herein.

FIG. 1 illustrates an example overview implementation as described herein. As shown in FIG. 1 a client device may connect with a network device to transmit/receive a data flow. In some implementations, the network device may transmit digital signals, corresponding to the data flow, via one or more optical channels. In some implementations, the network device may include a DSP for each optical channel. For example, a particular DSP may be provided to process a digital signal transmitted via a particular optical channel.

In some implementations, a controller server may provide, to the network device, a modulation change instruction (e.g., based on receiving the modulation change instruction from a user associated with the client device). In some implementations, the modulation change instruction may include a request to change the modulation format used by a particular DSP, associated with a particular optical channel, to modulate digital signals. For example, the modulation change instruction may include a request to change the modulation format from a BPSK format to a QPSK format (e.g., to increase available bandwidth). Based on receiving the modulation change instruction, the network device may direct the particular DSP to modify the modulation format.

In some implementations, the controller server may communicate with a licensing server to add, modify, and/or delete licenses, associated with the network device. For example, assume that the modulation change instruction includes a request to change the modulation format from a BPSK format to a QPSK format. Further, assume that insufficient QPSK licenses exist for the network device in a license repository associated with the network device (e.g., licenses that authorize the QPSK format to be used). Given this assumption, the licensing server may add a QPSK license and delete a BPSK license (e.g., a license that authorizes the BPSK format to be used). Alternatively, the licensing server may modify the BPSK license to a QPSK license.

In some implementations, licenses may be added, modified, and/or deleted such that the license repository includes licenses to support the changed modulation format. In some implementations, the modulation format may be changed without interrupting access to an optical channel while causing the license repository to be updated according to the modulation change instruction. In some implementations, the modulation format may be changed for optical channels that provide a single optical carrier per optical channel. Additionally, or alternatively, the modulation format may be changed for optical channels that provide multiple subcarriers per optical channel.

Figure 2:
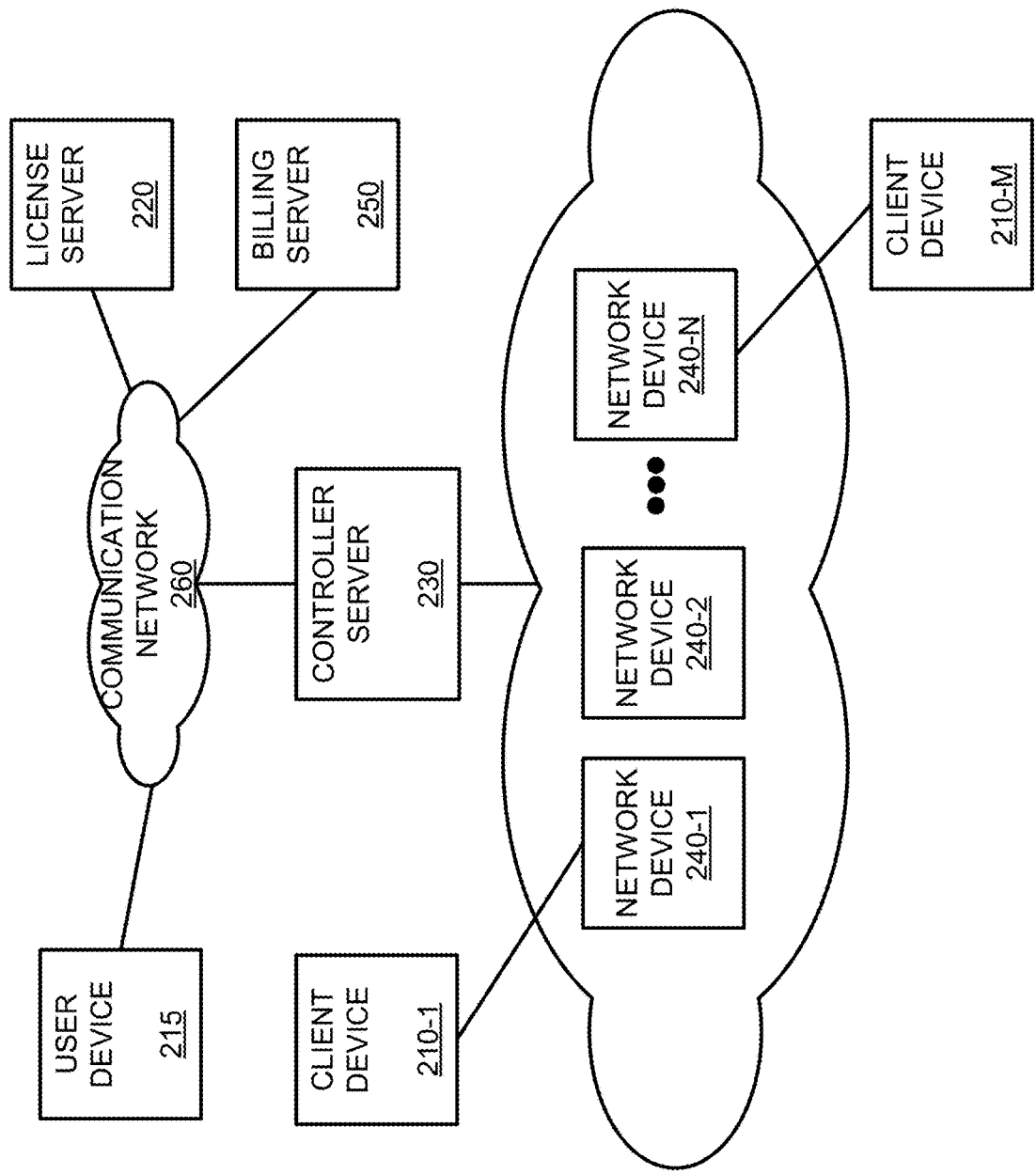
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include client devices 210-1, . . . , 210-M (where M≥1) (referred to collectively as "client devices 210" and individually as "client device 210"), user device 215, license server 220, controller server 230, network devices 240-1, . . . , 240-N (where N>1) (referred to collectively as "network devices 240" and individually as "network device 240"), billing server 250, and communication network 260.

Client device 210 may include a type of network device, such as a router, a switch, or a central office, that may transmit and/or receive data traffic. In some implementations, client device 210 may transmit a client signal (e.g., an optical transport network (OTN) signal, a synchronous optical network (SONET) signal, a synchronous digital hierarchy (SDH) signal, an Ethernet signal, or another type of signal) to network devices 240. The client signal may conform to any payload type, such as the payload types identified above.

User device 215 may include a device capable of communicating via a network, such as communication network 260. For example, user device 215 may correspond to a mobile communication device (e.g., a smart phone or a personal digital assistant (PDA)), a portable computer device (e.g., a laptop or a tablet computer), or another type of device, such as a desktop computing device, a server, or the like. In some implementations, user device 215 may provide a modulation change instruction to controller server 230 to cause network device 240 to modify a modulation format used to modulate a digital signal.

License server 220 may include one or more computing devices, such as a server device or a collection of server devices. In some implementations, license server 220 may store a license repository for a particular network device 240 and/or for a particular user of network services. In some implementations, a license may include information to authorize client device 210 to access a particular amount of bandwidth. Further, a license may include information that identifies a modulation format that may be used to provide the bandwidth. For example, a license may authorize 100 gigabits per second (G) of bandwidth using a QPSK modulation format.

Controller server 230 may include one or more computing devices, such as a server device or a collection of server devices. In some implementations, controller server 230 may receive a modulation change instruction and may cause network device 240 to modify a modulation format used to modulate a digital signal transmitted via a particular optical channel. In some implementations, controller server 230 may communicate with license server 220 to update licenses corresponding to the modulation change instruction.

Network device 240 may include a digital switching device (e.g., an OTN device), a dense wavelength division multiplexing (DWDM) device, or a device that is a combination of a digital switching device and a DWDM device. For example, network device 240 may perform digital or optical multiplexing operations (e.g., receive individual client signals on individual channels and generate a multiplexed signal, such as a multiplexed digital signal or a multi-wavelength optical signal, that may be transmitted on a single channel), amplification operations (e.g., amplify the multiplexed signal), add-drop multiplexing operations (e.g., remove one or more client signals from the multiplexed signal), and/or demultiplexing operations (e.g., receive the multiplexed signal and separate the multiplexed signal back into individual client signals that may be transmitted on individual channels). To perform these operations, network device 240 may contain various components, such as a multiplexer (to perform the multiplexing operations), an amplifier (to perform the amplification operations), an add-drop multiplexer (e.g., a remotely configurable add/drop multiplexer (ROADM)) (to perform the add-drop multiplexing operations), and/or a demultiplexer (to perform the demultiplexing operations). In some implementations, network devices 240 may be connected via an optical network, such as an optical transport network (OTN), a DWDM optical layer, and/or a combination of these or other types of networks.

In some implementations, network device 240 may receive a data flow from client device 210 and transmit the data traffic via one or more optical channels and/or network ports). In some implementations, network device 240 may include one or more DSPs to process and/or modulate a digital signal transmitted via corresponding optical channels. In some implementations, network device 240 may receive a modulation change instruction and direct the one or more DSPs to change a modulation format used to modulate a digital signal.

Billing server 250 may include one or more computing devices, such as a server device or a collection of server devices. In some implementations, billing server 250 may store license information for a particular user and may assess a debit transaction and/or a credit transaction to an account of a network service provider, which provides network transmission services, and/or to an account of the user. In some implementations, billing server 250 may identify a debit/credit amount based on an amount of bandwidth allocated to the user, a number of licenses associated with the user, and/or a modulation format used to modulate digital signals. In some implementations, billing server 250 may receive an update to the license information corresponding to a modulation change instruction and may update debit/credit transaction amounts based on the updated license information.

Communication network 260 may include one or more wired and/or wireless networks. For example, network 250 may include a cellular network (e.g., a second generation (2G) network, a third generation (3G) network, a fourth generation (4G) network, a fifth generation (5G) network, or the like), or a public land mobile network (PLMN). Additionally, or alternatively, communication network 260 may include a local area network (LAN), a wide area network (WAN), a metropolitan network (MAN), a telephone network (e.g., the Public Switched Telephone Network (PSTN)), an ad hoc network, a managed IP network, a multiprotocol layer switching (MPLS) network, an IP/MPLS network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3A:
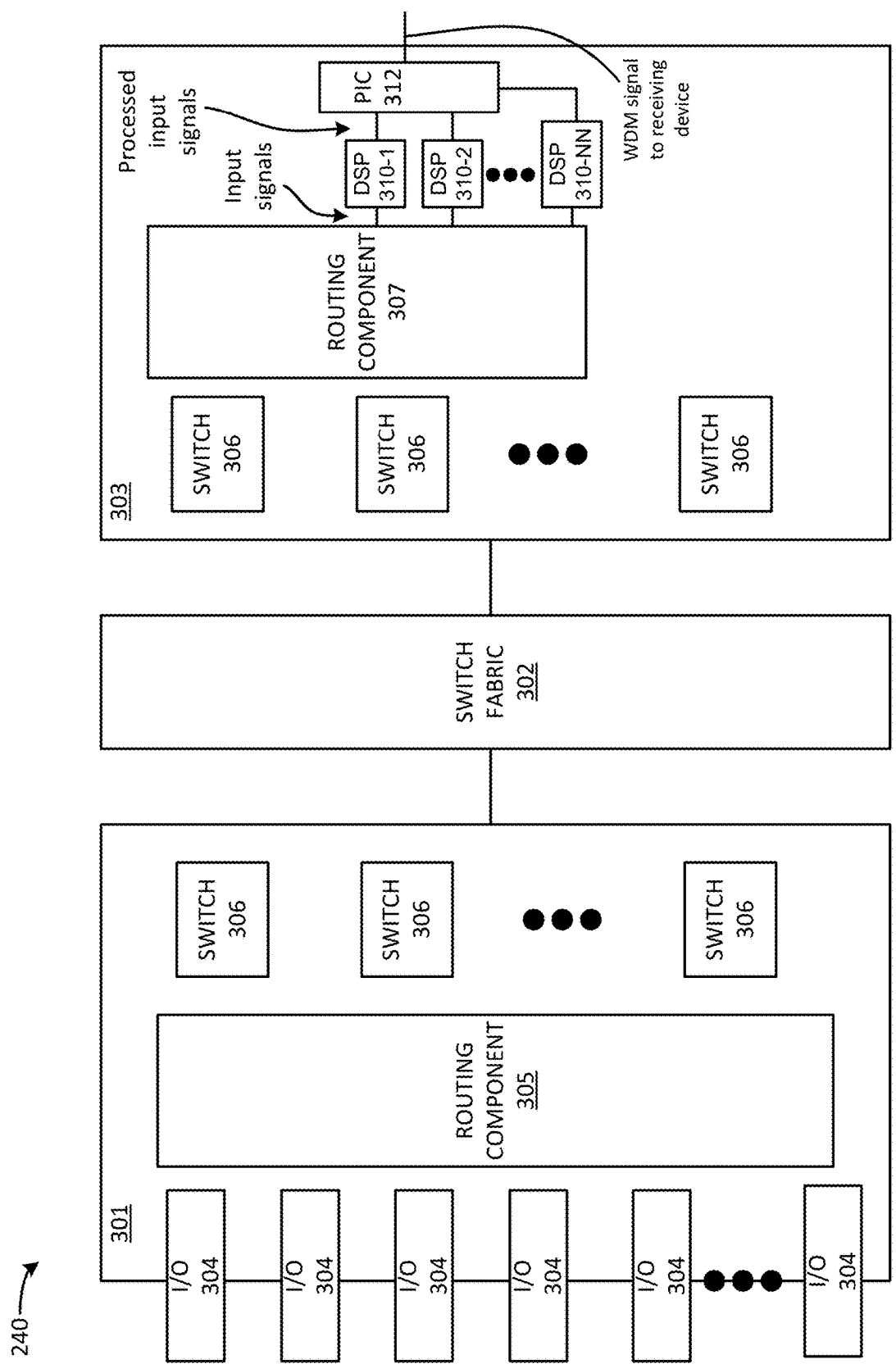
FIG. 3A illustrates example components of a network device that may be used within the environment of FIG. 2.

FIG. 3A illustrates example components of network device 240 that may be used within the environment of FIG. 2. As shown in FIG. 3A, network device 240 may include OTN module (OM) 301, switch fabric 302, and line module 303. OM 301 may include input/output (I/O) components 304, routing component 305 and switches 306.

I/O component 304 may include hardware components, or a combination of hardware and software components, that may support flexible adding-dropping of multiple services, such as SONET/SDH services, Gigabit Ethernet (GbE) services, OTN services, and/or fibre channel (FC) services.

I/O component 304 may perform functions, such as client data encapsulation and de-encapsulation. I/O component 304 may connect to a physical link that could be one of many types of transport media, such as optical fiber or Ethernet cable, a tributary interface module (TIM), a small-form pluggable (SFP) module, or the like.

Routing component 305 may include a routing processor, a collection of routing processors, and/or one or more switching planes, such as a single or multi-stage switch fabric. In some implementations, routing component 305 may perform a high level management function for OM 301 and may include a fabric manager to process digital signals for transmission to switches 306 and/or switch fabric 302. In some implementations, routing component 305 may convert a data flow for transmission across a particular network layer (e.g., a packet-based layer, a digital layer, or an optical layer).

In some implementations, routing component 305 may communicate with networks and/or systems connected to network device 240 to exchange information regarding network topology. In some implementations, routing component 305 may generate routing tables based on network topology information, may generate forwarding tables based on the routing tables, and may send the forwarding tables to I/O components 304. In some implementations, routing component 305 may perform other general control and monitoring functions for OM 301.

Switch 306 may include one or more switching planes to facilitate communication between two or more of I/O components 304, routing component 305, line card component 303, and/or some other component in network device 240. In some implementations, switch 306 may include a single or multi-stage switch fabric.

In some implementations, switch fabric 302 may include one or more switching planes, hardware components, or a combination of hardware and software components to facilitate communication between OM 301 and line module 303. In some implementations, switch fabric 302 may include a single or multi-stage switch fabric.

Line module 303 may include hardware components, or a combination of hardware and software components, that may provide network interface operations. For example, line module 303 may include switches 306, routing component 307, DSP 310-1 . . . , DSP 310-NN (where NN≥1), and photonic integrated circuit (PIC) 312. In some implementations, line module 303 may receive a multi-wavelength optical signal and/or transmit a multi-wavelength optical signal. A multi-wavelength optical signal may include a number of optical signals of different optical wavelengths. In one implementation, line module 303 may perform retiming, reshaping, regeneration, time division multiplexing, and/or recoding services for each optical wavelength. In some implementations, a particular line module 303 may connect to one or more other line modules 303 via switch fabric 302. In some implementations, a line module to line module cross-connection can be used for multi-directional traffic grooming at an electrical plane.

Routing component 307 may include a routing processor, a collection of routing processors, one or more switching planes, such as a single or multi-stage switch fabric. In some implementations, routing component 307 may perform a high level management function for line module 303 and may include a fabric manager to process digital signals for transmission to optical channels associated with PIC 312. In some implementations, routing component 307 may include an adaptation component having an optical-electrical-optical (OEO) device to convert an optical signal to an electrical signal, and/or to convert an electrical signal to an optical signal (e.g., to transport a data flow via an optical network layer and/or via a packet-based network layer). In some implementations, routing component 307 may provide input signals to DSPs 310.

DSP 310 may include a digital signal processor or a collection of digital signal processors. In some implementations, DSP 310 may receive a data signal (e.g., an input signal received via routing component 307), modulate the input signal, and provide processed signals having symbols that represent components of the input signal (e.g., an in-phase x-pol component, a quadrature (quad)-phase x-pol component, an in-phase y-pol component, and a quad-phase y-pol component). In some implementations, DSP 310 may provide the symbols by modulating the input signal by mapping bits, associated with the signal, to the symbols. Additionally, or alternatively, DSP may cause the input signal to be modulated based on a modulation algorithm corresponding to a particular modulation format (e.g., BPSK, QPSK, 3QAM, 8QAM, 16QAM, or some other type of modulation format). In some implementations, DSP 310 may receive a modulation change instruction and may modify the modulation format used to modulate the input signal based on the modification change instruction.

PIC 312 may include an optical device or a collection of optical devices. In some implementations, PIC 312 may have one or more optical components, such as an OEO device, an optical transmitter, an optical receiver, an optical transceiver, a laser, a digital to analog converter (DAC), a modulator, an amplifier (e.g., a transimpedence amplifier (TIA) and/or some other type of amplifier), a photodiode, an arrayed waveguide grating (AWG), a polarization rotator, a polarizer, a mirror, a heater, a splitter, a coupler, and/or some other optical component.

In some implementations, PIC 312 may receive multiple processed input signals from DSPs 310 and provide a wavedivision multiplexed (WDM) signal corresponding to the multiple input signals. For example, a modulator of PIC 312 may receive processed input signals from DSP 310 and modulate a reference signal provided by the laser of PIC 312 to modify a phase of the reference signal and provide a corresponding output signal to a multiplexer of PIC 312. In some implementations, the modification in the phase of the reference signal may correspond to data associated with the processed input signals provided by DSP 310. In some implementations, the multiplexer may receive multiple output signals provided by multiple modulators to form the WDM signal.

In some implementations, PIC 312 may be tuned to use an optical carrier (e.g., provided on an optical channel) of a designated wavelength. It may be desirable that the grid of wavelengths emitted by PIC 312 conform to a known standard, such as a standard published by the Telecommunication Standardization Sector (ITU-T). It may also be desirable that the grid of wavelengths be flexible and tightly packed to create a super-channel. In some implementations, PIC 312 may combine multiple optical channels to form a super-channel having bandwidth that includes the sum of the multiple optical channels.

In some implementations, PIC 312 may convert the data flow from an electrical signal to an optical signal and may transmit the data flow in the form of a WDM signal to a receiving device (e.g., another network device 240) such that the WDM signal may be converted from an optical signal into an electrical signal and/or a packet-based message (or some other type of signal or message) for transmission to client device 210. In some implementations, the WDM signal may be transmitted by a fiber optic network.

The quantity of components of network device 240, illustrated in FIG. 3A, is not limited to what is shown. In practice, there may be additional components, fewer components, different components, or differently arranged components than illustrated in FIG. 3A. Also, in some implementations, one or more of the components of network device 240 may perform one or more functions described as being performed by another one or more of the components in network device 240. Components of network device 240 may interconnect via wired connections, wireless connections, or a combination of wired and wireless connections. Also, in some implementations, the components may be implemented in a single physical device, or may be implemented in multiple physical devices in multiple locations.

Figure 3B:
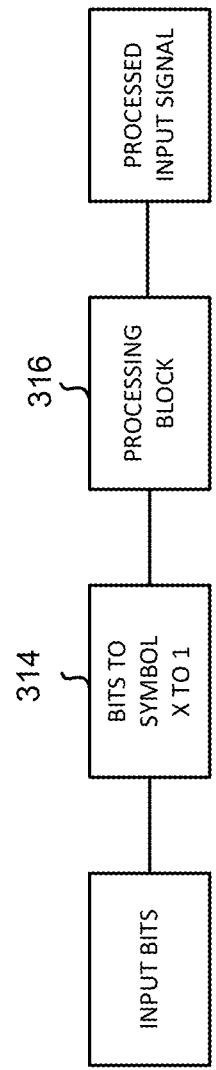
FIG. 3B illustrates example components of digital signal processor that may be implemented in a network device.

FIG. 3B illustrates example components of digital signal processor that may be implemented in a network device. As shown in FIG. 3B, DSP 310 may include bits to symbol component 314 and processing block 316.

Bits to symbol component 314 may receive input bits corresponding to an input signal received by routing component 307. In some implementations, bits to symbol component 314 may map the bits to symbols on the complex plane. For example, bits to symbol component 316 may map four bits to a symbol in the dual-polarization QPSK constellation. In some implementations, the symbols may correspond to components of the input signal (e.g., an in-phase x-pol component (XI), a quadrature (quad)-phase x-pol component (XQ), an in-phase y-pol component (YI), and a quad-phase y-pol component (YQ)).

In some implementations, bits to symbol component 314 may map the bits to symbols based on a table associated with a particular modulation format. That is, bits to symbol component 314 may map bits to symbols using a first table corresponding to a first modulation format, a second table corresponding to a second modulation format, a third table corresponding to the third modulation format, or the like. For example, a modulation change instruction may direct DSP 310 to select a particular table corresponding to the modulation format associated with the modulation change instruction.

Processing block 316 may receive the symbols from bits to symbols component 314 and may provide a processed input signal, corresponding to the XI, XQ, YI, and YQ components, to PIC 312. For example, processing block 316 may convert the symbols to the frequency domain using a fast Fourier transform (FFT) component, apply spectral shaping while in the frequency domain (e.g., to allow for multiple carriers to be provided on a particular optical channel), and return the symbols to the time domain using an inverse FFT (IFFT) component. In some implementations, processing block 316 may include a look-up table to provide integers to digital to analog converters (DACs) implemented on PIC 312 based on samples received by the IFFT component corresponding to the symbols.

In some implementations, processing component 316 may select a particular modulation algorithm to modulate an input signal. In some implementations, processing component 316 may select the particular modulation algorithm based on a modulation format associated with an optical channel of DSP 310.

While FIG. 3B shows DSP 310 as including a particular quantity and arrangement of functional components, in some implementations, DSP 310 may include additional functional components, fewer functional components, different functional components, or differently arranged functional components.

Figure 3C:
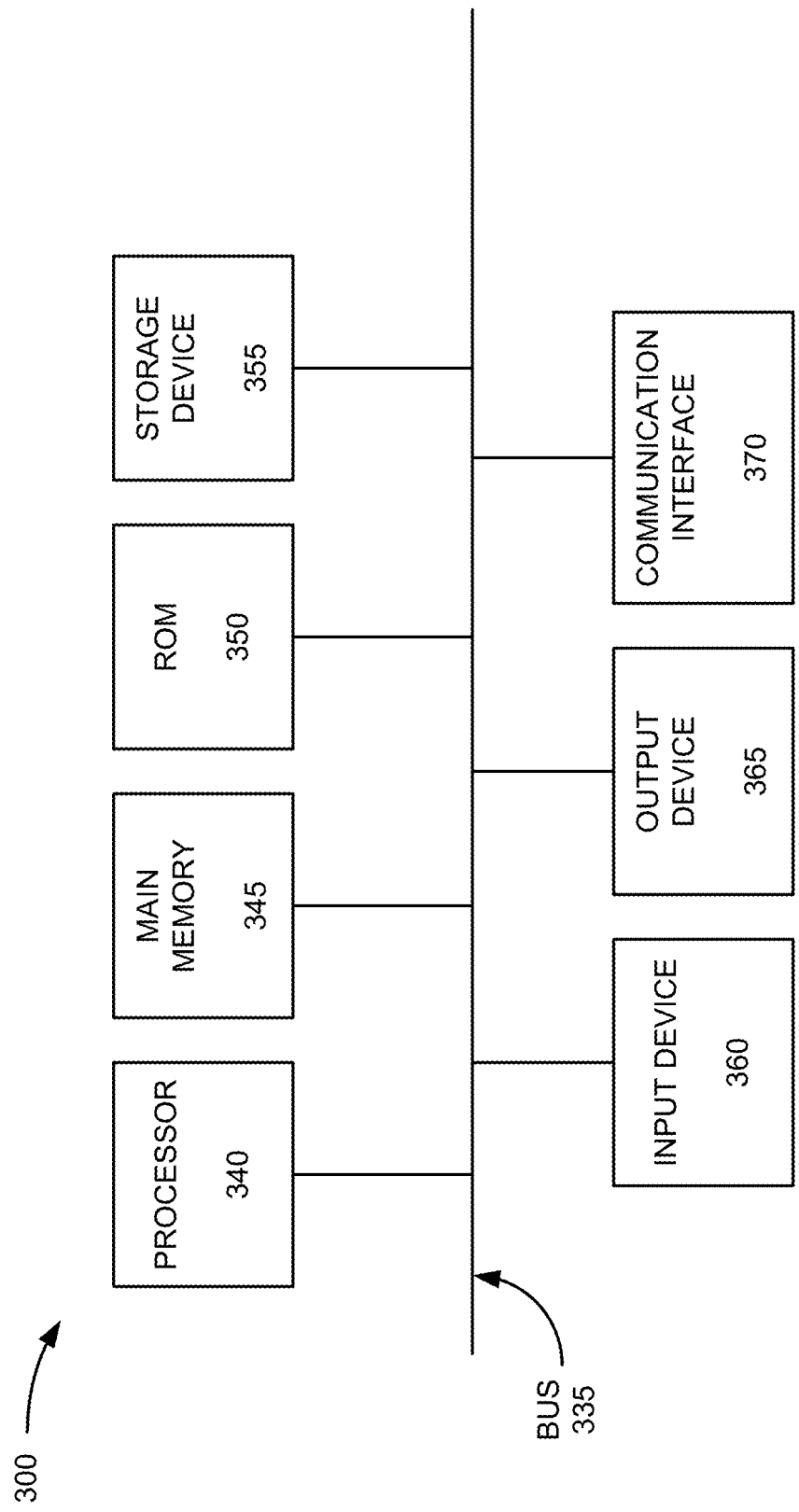
FIG. 3C illustrates example components of a device that may be used within the environment of FIG. 2.

FIG. 3C illustrates example components of a device 300 that may be used within environment 200 of FIG. 2. Device 300 may correspond to client device 210, license server 220, controller server 230, and/or billing server 250. Each of client device 210, license server 220, controller server 230, and/or billing server 250 may include one or more devices 300 and/or one or more components of device 300.

As shown in FIG. 3C, device 300 may include a bus 335, a processor 340, a main memory 345, a read only memory (ROM) 350, a storage device 355, an input device 360, an output device 365, and a communication interface 370.

Bus 335 may include a path that permits communication among the components of device 300. Processor 340 may include a processor, a microprocessor, an application specific integrated circuit (ASIC), a field programmable gate array (FPGA), or another type of processor that interprets and executes instructions. Main memory 345 may include a random access memory (RAM) or another type of dynamic storage device that stores information or instructions for execution by processor 340. ROM 350 may include a ROM device or another type of static storage device that stores static information or instructions for use by processor 340. Storage device 355 may include a magnetic storage medium, such as a hard disk drive, or a removable memory, such as a flash memory.

Input device 360 may include a component that permits an operator to input information to device 300, such as a control button, a keyboard, a keypad, or another type of input device. Output device 365 may include a component that outputs information to the operator, such as a light emitting diode (LED), a display, or another type of output device. Communication interface 370 may include any transceiver-like mechanism that enables device 300 to communicate with other devices or networks. In some implementations, communication interface 370 may include a wireless interface, a wired interface, or a combination of a wireless interface and a wired interface.

Device 300 may perform certain operations, as described in detail below. Device 300 may perform these operations in response to processor 340 executing software instructions contained in a computer-readable medium, such as main memory 345. A computer-readable medium may be defined as a non-transitory memory device. A memory device may include memory space within a single physical storage device or memory space spread across multiple physical storage devices.

The software instructions may be read into main memory 345 from another computer-readable medium, such as storage device 355, or from another device via communication interface 370. The software instructions contained in main memory 345 may direct processor 340 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3C.

Figure 4:
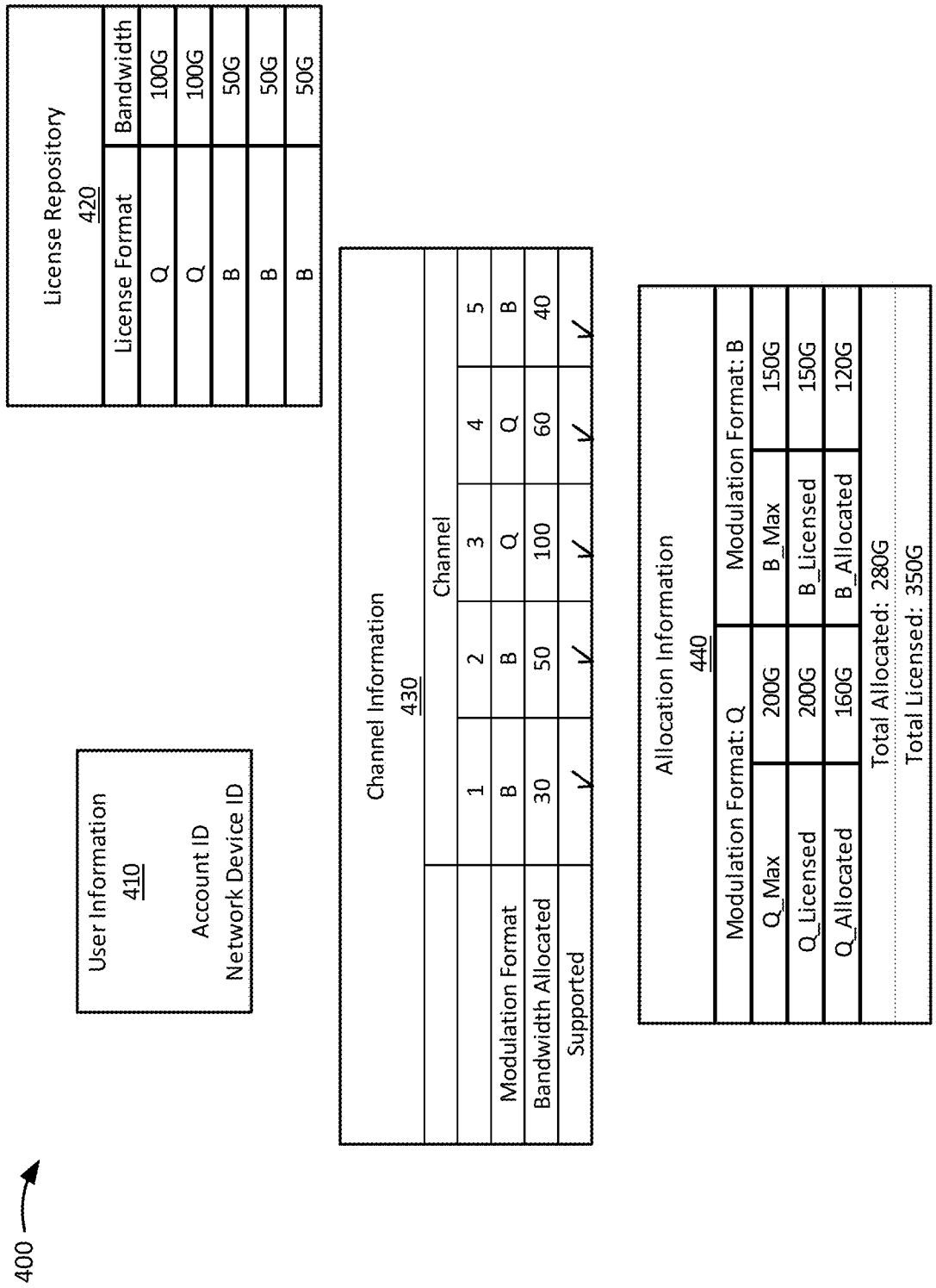
FIG. 4 illustrates an example data structure that may be stored by one or more devices in the environment of FIG. 2.

FIG. 4 illustrates an example data structure 400 that may be stored by one or more devices in environment 200. In some implementations, data structure 400 may be stored in a memory of license server 220, controller server 230, and/or billing server 250. In some implementations, data structure 400 may be stored in a memory separate from, but accessible by, license server 220, controller server 230, and/or billing server 250. In some implementations, data structure 400 may be stored by some other device in environment 200, such as client device 210 and/or network device 240. A particular instance of data structure 400 may store information associated with a particular user of a particular network device 240. Another instance of data structure 400 may store information associated with another user of another network device 240.

As shown in FIG. 4, data structure 400 may include user information field 410, license repository field 420, channel information field 430, and allocation information field 440.

User information field 410 may include information that identifies a particular user of a particular network device 240. In some implementations, user information field 410 may include an identifier of the user (e.g., an account identifier or the like), an identifier of network device 240 (e.g., a device identifier, a serial number, a media access control (MAC) address, or the like), and/or additional information regarding the user and/or the particular network device 240.

License repository field 420 may store a list of licenses associated with the particular network device 240 and corresponding to licenses with which the user is subscribed. In some implementations, license repository field 420 may store an identifier for each license. For example, license repository field 420 may store the character "Q" to identify a QPSK license, the character "B" to identify a BPSK license, and/or some other character to identify a license associated with another modulation format. As an example, assume that the user is subscribed to three BPSK licenses and two QPSK licenses. Given this assumption, license repository field 420 may store the list "Q, Q, B, B, B." As further shown in FIG. 4, license repository field 420 may store information identifying an amount of bandwidth with which the license authorizes access. For example, a Q license may authorize 100G of bandwidth, whereas a B license may authorize 50G of bandwidth (e.g., since the QPSK modulation format provides double the data rates as the BPSK modulation format). In some implementations, a license may authorize a particular amount of bandwidth across all channels associated with a user. For example, a Q license may authorize 100G of bandwidth across all the channels (e.g., a single Q license may authorize 50G of bandwidth on one channel and 50G of bandwidth on another channel).

Channel information field 430 may identify one or more optical channels via which network device 240 transmits data flows. In some implementations, channel information field 430 may identify a modulation format associated with each optical channel and/or a measure of bandwidth available for each optical channel (e.g., based on an amount of bandwidth with which the user is subscribed). In some implementations, channel information field 430 may further store an indication that identifies whether bandwidth used by the optical channel is supported by a license stored by license repository field 420. For example, channel information field 430 may store an indication (e.g., a check mark "√") that identifies that the optical channel is supported when license repository field 420 stores sufficient licenses to authorize the use of the optical channel.

In some implementations, controller server 230 may determine whether an optical channel is supported (e.g., when the modulation format of an optical channel is modified) and may communicate with license server 220 to add/modify/delete licenses in order to bring a user's account into compliance (e.g., such that all of the optical channels are supported by licenses stored by license repository field 420). Some examples of controller server 230 determining whether an optical channel is supported are described below with respect to FIGS. 7A-7C.

Allocation information field 440 may store information that identifies maximum bandwidth provided by optical channels associated with a particular modulation format, an amount of bandwidth that a user is authorized to access based on licenses stored by license repository field 420, and an amount of bandwidth allocated to the user and/or in use by the user. For example, a value for "Q_Max" may represent a maximum bandwidth provided by optical channels associated with the QPSK modulation format. In some implementations, the value for "Q_Max" may be determined based on a quantity of optical channels associated with the QPSK modulation format (e.g., QPSK channels) multiplied by the amount of bandwidth that each QPSK channel is capable of providing. For example, assume that each QPSK channel is capable of providing 100G of bandwidth and that there are two QPSK channels. Given these assumptions, allocation information field 440 may store the value 200G for "Q_Max."

In some implementations, a value for "Q_Licensed" may correspond to the number of licenses stored by license repository field 420 associated with the QPSK modulation formation (e.g., Q licenses) multiplied by the amount of bandwidth that each Q license authorizes the user to access. For example, assume that license repository field 420 stores two Q licenses and that each Q license authorizes the user to access 100G of bandwidth. Given these assumptions, allocation information field 400 may store the value 200G for "Q_Licensed."

In some implementations, a value for "Q_Allocated" may correspond to an amount of bandwidth that the user has selected to subscribe to on the optical channels associated with the QPSK modulation format. For example, the user may select to subscribe to a particular amount of bandwidth based on bandwidth demands of the user and/or based on costs that may be proportional to the amount of bandwidth allocated. In some implementations, the term "allocated" may additionally or alternatively refer to an amount of bandwidth in use by the user.

In some implementations, allocation information field 440 may store information identifying a total amount of bandwidth that the user has licensed (e.g., based on information stored by license repository field 420 and/or based on the sum of the "Q_Licensed" and the "B_Licensed" values) and a total amount of bandwidth allocated to the user (e.g., bandwidth that the user has subscribed to based on a sum of the "Q_Allocated" and the "B_Allocated" values).

As described in greater detail below with respect to FIGS. 7A-7C, controller server 230 may determine that an optical channel is not supported when the allocated value for a modulation format exceeds the licensed value for the modulation format (e.g., when Q_Allocated exceeds Q_Licensed, when B_Allocated exceeds B_Licensed, etc.). In some implementations (e.g., when a user provides a request to increase the total allocated value such that the total allocated value exceeds the total licensed value), controller server 230 may direct the user to authorize the addition of a license such that the total allocated value is less than or equal to the total licensed value.

While FIG. 4 illustrates examples of optical channels associated with either a QPSK modulation format or a BPSK modulation formation, in practice, data structure 400 may store information for optical channels associated with any modulation format (e.g., QPSK, BPSK, 3QAM, 5QAM, 8QAM 16QAM, or the like).

While particular fields are shown in a particular format in data structure 400, in practice, data structure 400 may include additional fields, fewer fields, different fields, or differently arranged fields than are shown in FIG. 4. Also, information stored by data structure 400 is shown merely as examples. In practice, other examples of information stored by data structure 400 are possible.

Figure 5:
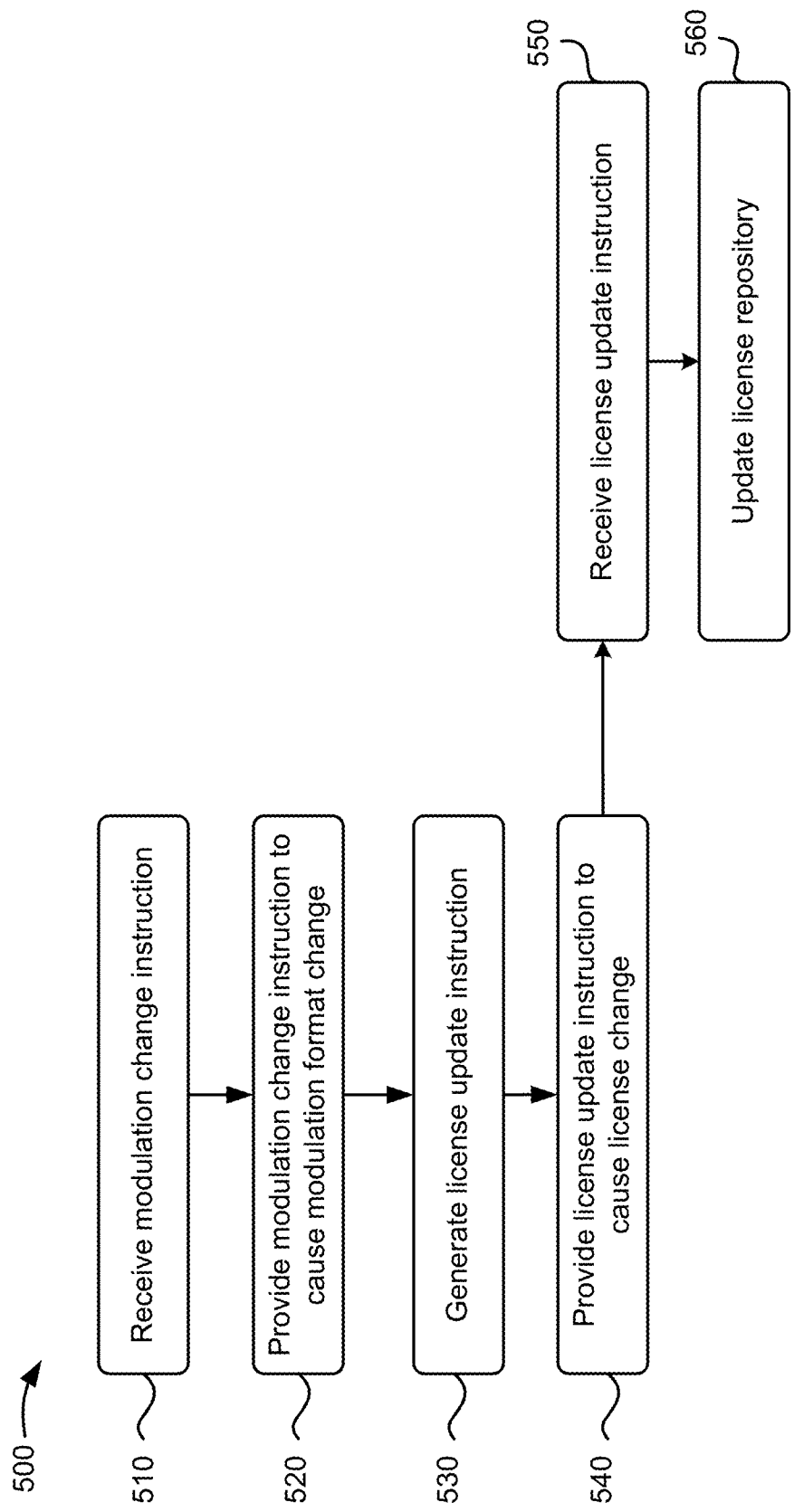
FIG. 5 illustrates a flowchart of an example process for changing a modulation format and updating a license repository to reflect the change in the modulation format.

FIG. 5 illustrates a flowchart of an example process 500 for changing a modulation format and updating licenses to reflect the change in the modulation format. In some implementations, process 500 may be performed by one or more components of controller server 230 and/or license server 220. In some implementations, some or all of blocks of process 500 may be performed by one or more components of another device in environment 200 (e.g., client device 210, user device 215, and/or billing server 250) or a group of devices including or excluding controller server 230 and/or license server 220.

As shown in FIG. 5, process 500 may include receiving a modulation change instruction (block 510). For example, controller server 230 may receive the modulation change instruction from user device 215 (e.g., via a web portal or via some other technique). In some implementations, the modulation change instruction may include information identifying a particular user (e.g., based on a user ID, an account ID, or the like), a particular network device 240 associated with the user, and a request to change the modulation format associated with a particular optical channel associated with network device 240. As an example, the modulation change instruction may include a request to change the modulation format, associated with the particular optical channel, from a BPSK modulation format (e.g., an original modulation format) to a QPSK modulation format (e.g., an updated modulation format).

Process 500 may also include providing the modulation change instruction to cause the modulation format change (block 520). For example, controller server 230 may provide the modulation change instruction to the particular network device 240 to cause a DSP 310, associated with the particular optical channel, to change the modulation format based on receiving the modulation change instruction. For example, DSP 310 may change the modulation format by selecting a table corresponding to the updated modulation format (e.g., a table used by bits to symbol component 314 to map bits associated with an input signal to corresponding symbols). Additionally, or alternatively, DSP 310 may change the modulation format by causing processing component 316 to select a modulation algorithm (e.g., to modulate the input signal) corresponding to the updated modulation format. Additionally, or alternatively, DSP 310 may perform some other function in order to change the modulation format to the updated modulation format.

Process 500 may further include generating a license update instruction (block 530). For example, controller server 230 may determine whether a license repository, associated with the user, includes sufficient licenses to support the modulation format change (e.g., based on information stored by data structure 400). As described above with respect to allocation information field 440, controller server 230 may determine that the license repository does not include sufficient licenses to support the modulation format change when a bandwidth value allocated for a particular modulation format (e.g., a first value) exceeds a bandwidth value licensed for the particular modulation format (e.g., a second value). For example, the first value may exceed the second value when the modulation change instruction includes a request to change the modulation format of an optical channel such that the bandwidth allocated to the modulation format exceeds the bandwidth licensed for the modulation format.

As an example, assume that a license repository for the user includes two Q licenses corresponding to 200G of bandwidth licensed for the QPSK modulation format (e.g., corresponding to a "Q_Licensed" value of 200G). Further, assume that the modulation change instruction includes a request to change the modulation format of one or more optical channels, associated with the user, such that 250G is allocated to the user and to the QPSK modulation format (e.g., corresponding to a "Q_Allocated" value of 250G). Given these assumptions, controller server 230 may generate a license update instruction to direct license server 220 to add a license such that the "Q_Licensed" value is equal to or greater than the "Q_Allocated" value. In some implementations, controller server 230 may not generate a license update instruction (e.g., when the "Q_Licensed" value is equal to or greater than the "Q_Allocated" value after the modulation format change). Additional examples of generating license update instruction are described below with respect to FIGS. 7A-7C.

Process 500 may also include providing the license update instruction to cause a license change (block 540). For example, controller server 230 may provide the license update instruction to license server 220 based on generating the license update instruction, as described above. In some implementations, controller server 230 may encrypt the license update instruction prior to providing the license update instruction. In some implementations, controller server 230 may provide the license update instruction via a secure tunnel to prevent tampering of the license update instruction.

Process 500 may further include receiving the license update instruction (block 550) and updating the license repository (block 560). For example, license server 220 may receive the license update instruction from controller server 230 and may decrypt the license update instruction (e.g., when the license update instruction is encrypted). In some implementations, license server 220 may execute the license update instruction to update the license repository. For example, license server 220 may add, modify, and/or remove licenses from the license repository associated with the user. Some examples of updating a license repository are described below with respect to FIGS. 7A-7C.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

Figure 6:
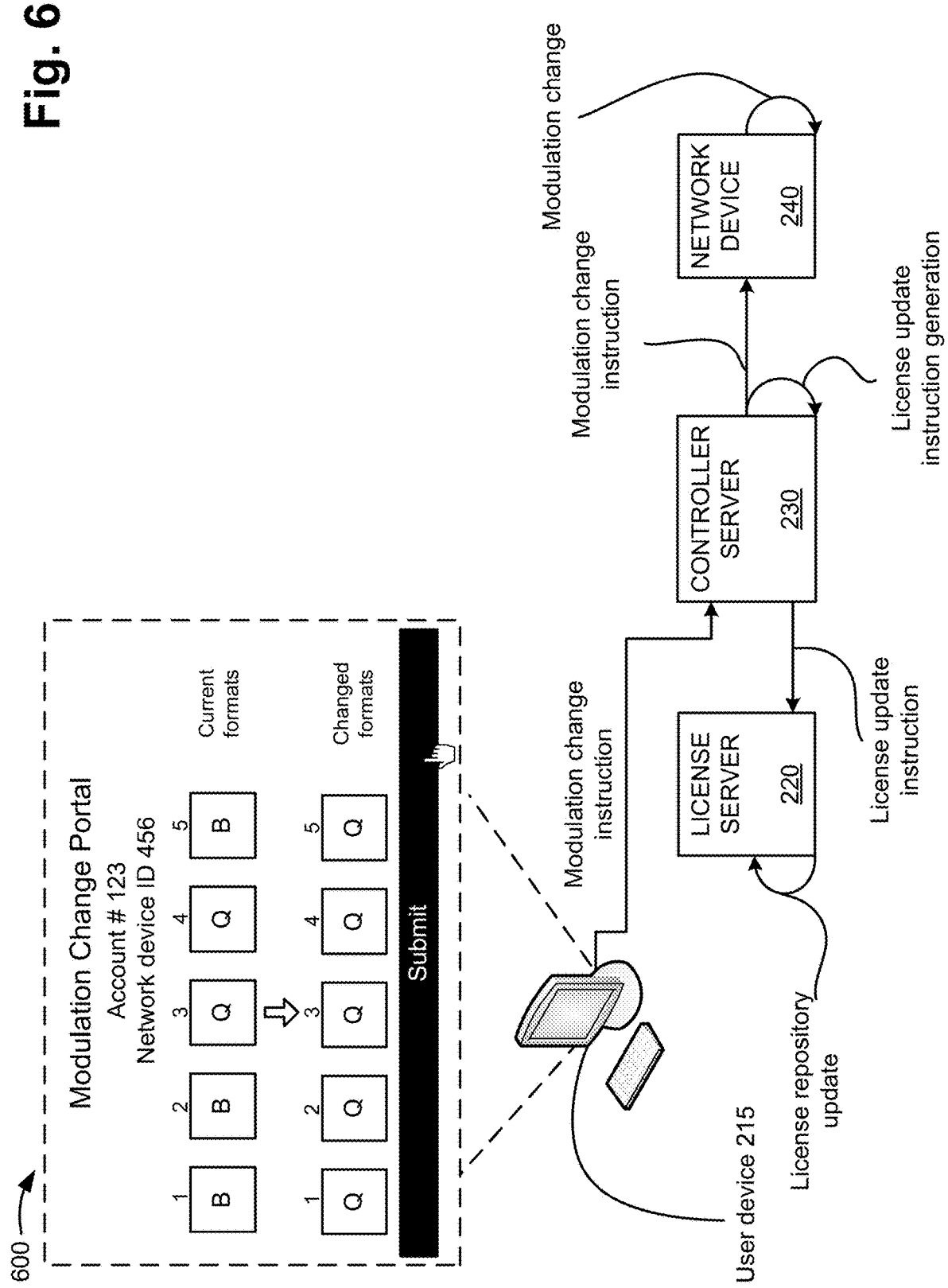
FIG. 6 illustrates an example implementation as described herein.

FIG. 6 illustrates an example implementation as described herein. As shown in FIG. 6, user device 215 may provide a modulation change instruction to controller server 230 (e.g., via interface 600 corresponding to a modulation change portal accessible via the Internet, an application, or the like). For example, a user of user device 215 may provide login information to access the modulation change portal and may select to change the modulation format for one or more optical channels associated with the user. In the example shown in interface 600, the user may select to modify optical channels 1, 2, and 5 from the BPSK modulation format to the QPSK modulation format such that optical channels 1-5 are associated with the QPSK modulation format (after the modulation change).

As described above, the modulation change instruction may include an identifier of the user (e.g., based on the login information), an identifier of a particular network device 240 associated with the user (e.g., based on the login information), and a request to change a modulation format for one or more optical channels associated with the user (e.g., corresponding to a modulation format change as shown in interface 600).

In some implementations, controller server 230 may receive the modulation change instruction (e.g., in accordance with block 510 as described above), provide the modulation change instruction to network device 240 to cause the modulation format change (e.g., in accordance with block 520 as described above), perform a license update function to generate a license update instruction (e.g., in accordance with block 530 as described above), and provide the license update instruction to license server 220 to cause license server 220 to update one or more licenses stored by a license repository associated with the user (e.g., in accordance with block 540 as described above). In some implementations, license server 220 may receive the license update instruction and may add, remove, and/or update licenses in the license repository (e.g., in accordance with blocks 550-560 as described above).

In some implementations (e.g., when controller server 230 generates a license update instruction), controller server 230 may query user device 215 for authorization to provide the license update instruction to license server 220 (e.g., to confirm the modulation format change and/or to authorize any charges that may apply to the modulation format change). In some implementations, license server 220 may provide information to billing server 250 regarding licenses in the license repository that have been added, removed, and/or modified such that billing server 250 may assess debits and/or credits to an account associated with the user corresponding to the changes in the license repository.

While a particular example is shown in FIG. 6, the above description is merely an example implementation. In practice, other examples are possible from what is described above in FIG. 6. Also, while a particular format of interface 600 is shown, in practice, interface 600 may have a different format and appearance than what is shown in FIG. 6.

Figure 7A:
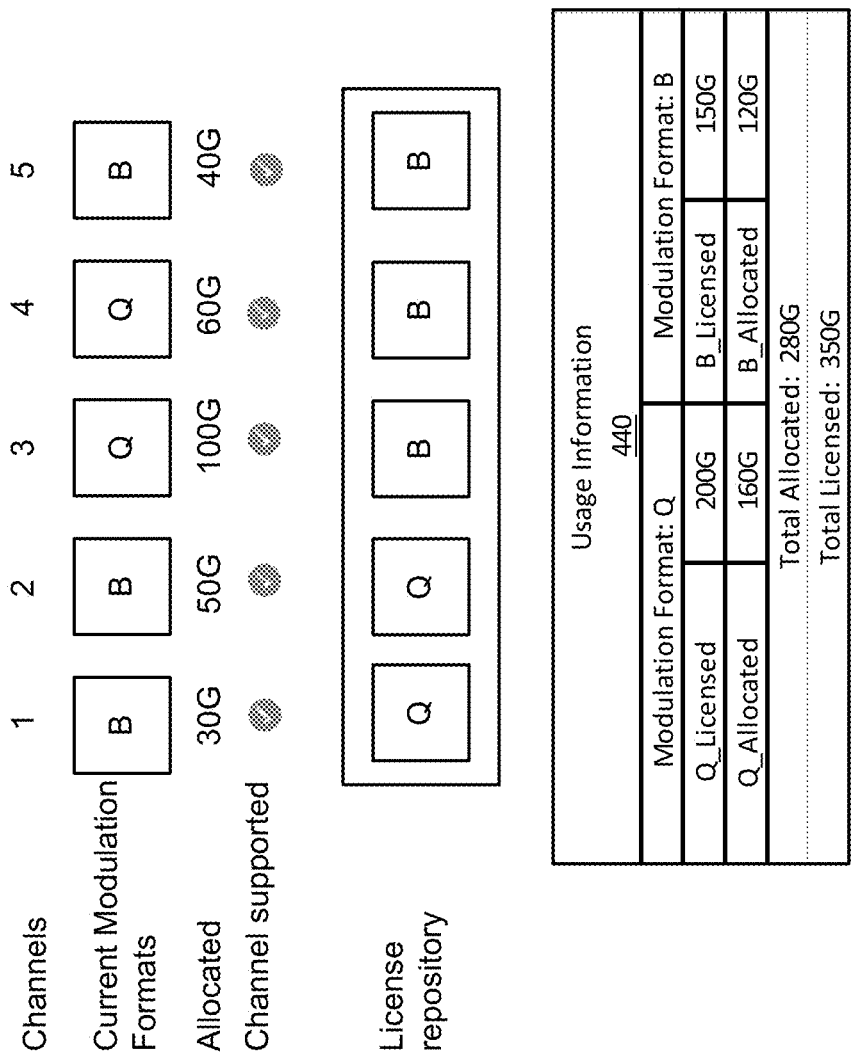
FIGS. 7A-7C illustrate an example implementation as described herein.
Figure 7B:
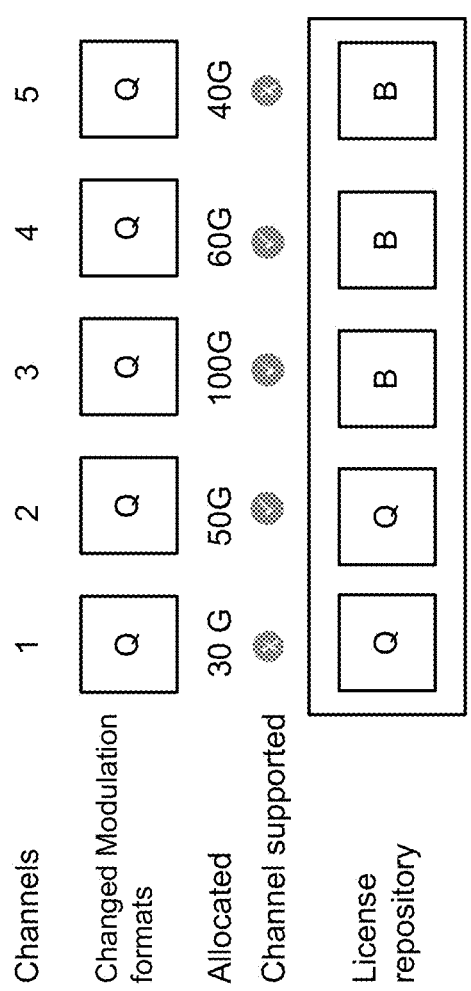
Figure 7C:
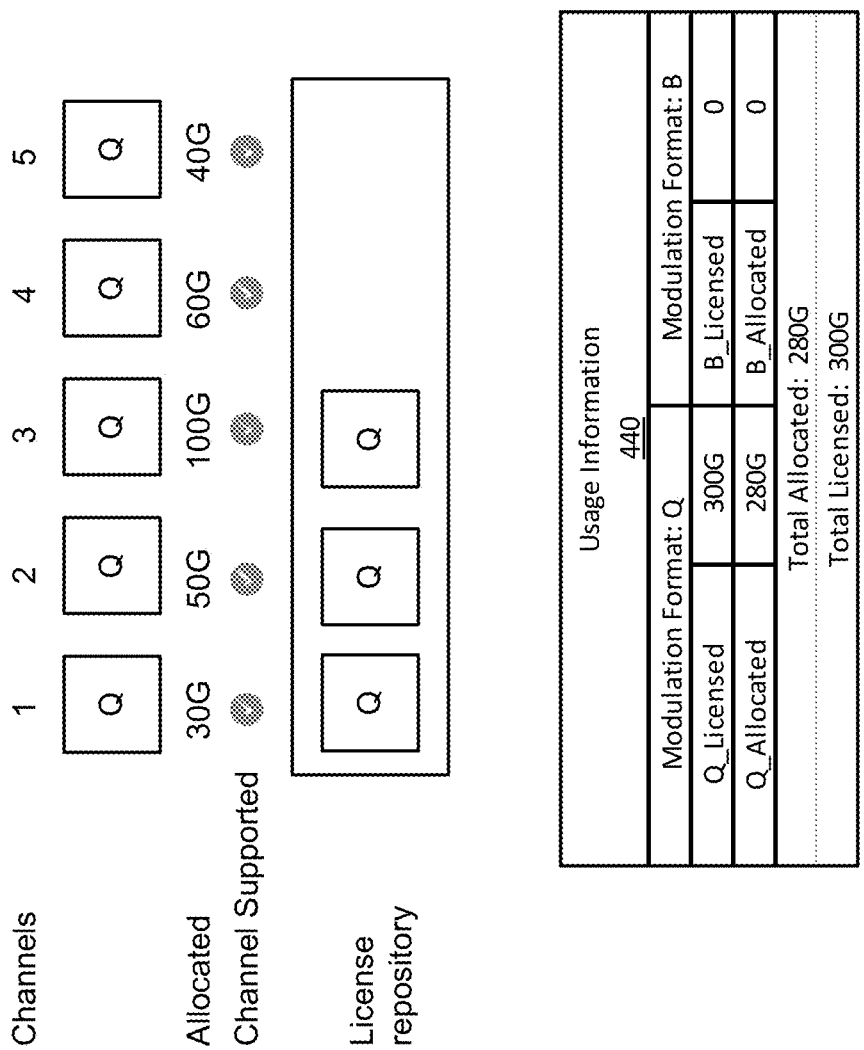

FIGS. 7A-7C illustrate an example implementation as described herein. FIGS. 7A-7C illustrate an example of changing modulation formats for multiple optical channels, associated with a particular user, and updating licenses in a license repository of the user to support the modulation format change. Referring to FIG. 7A, assume that a user is associated with five optical channels (e.g., channels 1-5). Further, assume that channels 1, 2, and 5 are associated with the BPSK modulation format (e.g., as indicated by "B") and that channels 3 and 4 are associated with the QPSK modulation format (as indicated by "Q"). Further, assume that 30G of bandwidth is allocated to channel 1, 50G of bandwidth is allocated to channel 2, 100G of bandwidth is allocated to channel 3, 60G of bandwidth is allocated to channel 4, and 40G of bandwidth is allocated to channel 5. Further, assume that a license repository for the user includes two Q licenses and three B licenses. Further, assume that each Q license authorizes 100G of bandwidth to be modulated using the QPSK modulation format and that each B license authorizes 50G of bandwidth to be modulated using the BPSK modulation formation.

Given these assumptions, license server 220 and/or controller server 230 may store (e.g., in allocation information field 440) a "Q_Licensed" value of 200G (e.g., corresponding to two Q licenses in the license repository multiplied by 100G per Q license). Further, allocation information field 440 may store a "Q_Allocated" value of 160G (e.g., corresponding to the sum of bandwidth allocated on optical channels associated with the QPSK modulation format). Further, allocation information field 440 may store a "B_Licensed" value of 150G (corresponding to three B licenses in the license repository multiplied by 50G per B license). Further, allocation information field 440 may store a "B_Allocated" value of 120G (e.g., corresponding to the sum of bandwidth allocated on optical channels associated with the BPSK modulation format). Further, allocation information field 440 may store a "total allocated" value of 280G (e.g., corresponding to the sum of bandwidth allocated across channels 1-5) and a "total licensed" value of 350G (e.g., corresponding to the sum of the "Q_Licensed" value and the "B_Licensed" value). As shown in FIG. 7A, optical channels 1-5 may be supported by licenses stored by the license repository (e.g., since the "Q_Allocated" value is less than the "Q_Licensed" value and the "B_Allocated" value is less than the "B_Licensed" value).

Referring to FIG. 7B, assume that the user provides a modulation change instruction to request to change the modulation formats of channels 1, 2, and 5 from the BPSK modulation format to the QPSK modulation format. Further, assume that network device 240 receives the modulation change instruction (e.g., via controller server 230) and that network device 240 executes the modulation change instruction to change the modulation formats of channels 1, 2, and 5 from the BPSK modulation format to the QPSK modulation format. Given these assumptions, allocation information field 440 may store a "Q_Licensed" value of 200G and a "Q_Allocated" value of 280G. As shown in FIG. 7B, bandwidth of channels 2, and 5 (or channels 1 and 5) may not be supported since the "Q_Licensed" value is less than the "Q_Allocated" value (e.g., indicating that the license repository does not store sufficient licenses to support the QPSK modulation format for bandwidth on channels 2, and 5 (or channels 1 and 5)). In some implementations, controller server 230 may generate a license update instruction based on identifying that the "Q_Licensed" value is less than the "Q_Allocated" value. For example, controller server 230 may generate an instruction to add a Q license such that the "Q_Licensed" value is greater than or equal to the "Q_Allocated" value. In some implementations, data flows may continue to be transmitted via channels 1-5 and modulated in accordance with the changed modulation formats when the license repository does not include sufficient licenses to support the changed modulation formats (e.g., to prevent service interruption).

Referring to FIG. 7C, license server 220 may update the license repository to add the Q license. In some implementations, the license update instruction may further direct license server 220 to remove the B licenses (e.g., when the B licenses are no longer being used). Alternatively, the license update instruction may direct license server 220 to modify a B license to a Q license and to remove the unused B licenses. As further shown in FIG. 7C, allocation information field 440 may store the "Q_Licensed" value of 300G (corresponding to three Q licenses in the license repository multiplied by 100G of bandwidth per Q license) and the "Q_Allocated" value of 280G. As shown in FIG. 7C, channels 1-5 may be supported with only three Q licenses since the "Q_Allocated" value is less than the "Q_Licensed" value.

In some implementations, a user may provide a request (e.g., to controller server 230) to allocate additional bandwidth to one or more optical channels. In some implementations, controller server 230 may allocate the additional bandwidth when the "total allocated" value, corresponding to the total bandwidth requested, is less than or equal to the "total licensed" value. In some implementations, controller server 230 may direct the user to authorize the addition of a license to support the request to allocate additional bandwidth when the "total allocated" value is to exceed the "total licensed" value based on the request to allocate additional bandwidth.

While a particular example is shown in FIGS. 7A-7C, the above description is merely an example implementation. In practice, other examples are possible from what is described above in FIGS. 7A-7C.

As described above, licenses may be added, modified, and/or removed such that the license repository includes licenses to support a changed modulation format (e.g., corresponding to a modulation change instruction). In some implementations, the modulation format may be changed without interrupting access to an optical channel while causing the license repository to be updated according to the modulation change instruction.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Some implementations are described herein in conjunction with thresholds. The term "greater than" (or similar terrors), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   generating by a network device with a digital signal processor (DSP) first signals modulated in accordance with a first quadrature amplitude modulation (QAM);
   modifying by the network device a phase of a reference signal based on the first signals by modulating the reference signal output from a laser;
   receiving by one or more servers, an instruction to change the first QAM modulation to a second QAM modulation;
   providing by the one or more servers, the instruction to the network device;
   generating by the network device with the digital signal processor (DSP), second signals modulated in accordance with the second quadrature amplitude modulation (QAM);
   modifying by the network device the phase of the reference signal based on the second signals by modulating the reference signal output from the laser;
   determining by one or more servers a quantity of licenses stored by a license repository associated with the second QAM modulation;
   determining by one or more servers bandwidth values of each of the licenses associated with the second QAM modulation;
   determining by one or more servers a first value based on determined quantity of licenses and bandwidth values;
   determining by one or more servers a second value corresponding to an amount of bandwidth allocated to one or more optical channels;
   determining by one or more servers that the first value is less than the second value;
   determining by one or more servers, that the license repository is to be updated based on receiving the instruction to change the first QAM modulation to the second QAM modulation and determining that the first value is less than the second value;
   generating by the one or more servers, a license update instruction based on determining that the license repository is to be updated; and
   providing by the one or more servers the license update instruction to the license repository.

2. The method in accordance with claim 1, where the DSP is associated with one or more optical channels.

3. The method in accordance with claim 1, where each of the one or more optical channels includes a plurality of optical subcarriers.

4. The method in accordance with claim 2, where each of the one or more optical channels includes a single optical carrier.

5. The method in accordance with claim 1, where the first QAM modulation or the second QAM modulation corresponds to a 3QAM modulation, an 8QAM modulation, a 16QAM modulation, a 32QAM modulation, a 64QAM modulation, a 128QAM modulation, or a 256QAM modulation.

6. The method in accordance with claim 1, further comprising:
   causing a credit or debit to be assessed to an account, associated with a user of the modulated reference signal, based on information relating to the license update instruction.

7. The method in accordance with claim 1, where the instruction further causes the network device provide a wave division multiplexed (WDM) signal.

* * * * *